US008808923B2

(12) United States Patent
Nakagiri et al.

(10) Patent No.: US 8,808,923 B2
(45) Date of Patent: Aug. 19, 2014

(54) SEPARATOR FOR NON-AQUEOUS ELECTROLYTE SECONDARY BATTERY AND NON-AQUEOUS ELECTROLYTE SECONDARY BATTERY USING THE SAME

(75) Inventors: Yasushi Nakagiri, Tokushima (JP); Yasuyuki Shibano, Nara (JP); Norihiro Yamamoto, Osaka (JP)

(73) Assignee: Panasonic Corporation, Osaka (JP)

(*) Notice: Subject to any disclaimer, the term of this patent is extended or adjusted under 35 U.S.C. 154(b) by 140 days.

(21) Appl. No.: 13/513,337

(22) PCT Filed: Jul. 19, 2011

(86) PCT No.: PCT/JP2011/004082
§ 371 (c)(1),
(2), (4) Date: Jun. 1, 2012

(87) PCT Pub. No.: WO2012/042716
PCT Pub. Date: Apr. 5, 2012

(65) Prior Publication Data
US 2012/0237832 A1 Sep. 20, 2012

(30) Foreign Application Priority Data
Sep. 30, 2010 (JP) .................................. 2010-221133

(51) Int. Cl.
*H01M 2/16* (2006.01)
*H01M 2/14* (2006.01)
*H01M 10/05* (2010.01)

(52) U.S. Cl.
CPC ................. *H01M 2/16* (2013.01); *H01M 10/05* (2013.01); *Y02E 60/12* (2013.01)
USPC ............................. 429/246; 429/247; 429/249

(58) Field of Classification Search
None
See application file for complete search history.

(56) References Cited

U.S. PATENT DOCUMENTS

| 6,048,607 A | 4/2000 | Hashimoto et al. |
| 2008/0096102 A1* | 4/2008 | Hatayama et al. ............ 429/122 |

FOREIGN PATENT DOCUMENTS

| JP | 08-007925 | 1/1996 |
| JP | 10-258462 | 9/1998 |
| JP | 11-302436 | 11/1999 |
| JP | 2002-367589 | 12/2002 |
| JP | 2005-343958 | 12/2005 |
| JP | 2006-169497 | 6/2006 |
| JP | 2009-226746 | 10/2009 |
| JP | 2011-068906 | 4/2011 |

OTHER PUBLICATIONS

International Search Report issued in International Patent Application No. PCT/JP2011/004082 dated Oct. 18, 2011.

* cited by examiner

*Primary Examiner* — Barbara Gilliam
*Assistant Examiner* — Angela Martin
(74) *Attorney, Agent, or Firm* — McDermott Will & Emery LLP

(57) ABSTRACT

Disclosed is a separator for a non-aqueous electrolyte secondary battery, the separator including a biaxially-oriented polyolefin porous film including extended-chain crystals and folded-chain crystals, wherein the extended-chain crystals and the folded-chain crystals form a shish-kebab structure. The average distance between the extended-chain crystals adjacent to each other is 1.5 μm or more and less than 11 μm, and the average distance between the folded-chain crystals adjacent to each other is 0.3 μm or more and less than 0.9 μm. A heat resistant porous film may be laminated on the polyolefin porous film. The heat resistant porous film includes a resin having heat resistance or a melting point higher than a melting point of the polyolefin porous film.

8 Claims, 2 Drawing Sheets

SEPARATOR FOR NON-AQUEOUS ELECTROLYTE SECONDARY BATTERY AND NON-AQUEOUS ELECTROLYTE SECONDARY BATTERY USING THE SAME

RELATED APPLICATIONS

This application is the U.S. National Phase under 35 U.S.C. §371 of International Application No. PCT/JP2011/004082, filed on Jul. 19, 2011, which in turn claims the benefit of Japanese Application No. 2010-221133, filed on Sep. 30, 2010, the disclosures of which Applications are incorporated by reference herein.

TECHNICAL FIELD

The present invention relates to an improvement of a separator for a non-aqueous electrolyte secondary battery including a polyolefin porous film, and further relates to a non-aqueous electrolyte secondary battery exhibiting an improved capacity retention rate in charge/discharge cycles for rapidly charging the battery.

BACKGROUND ART

In recent years, a rapidly increasing number of electronic devices are becoming portable and cordless. The driving power sources used for such devices are small-sized consumer-use secondary batteries which are small in size and light in weight and have a high energy density. Further, for uses as driving power sources for power storage equipment and electric vehicles, large-sized secondary batteries are being developed. These secondary batteries are required to have characteristics such as high output characteristics, long-term durability, and safety. Under these circumstances, development is actively carried out for non-aqueous electrolyte secondary batteries with high voltage and high energy density.

However, if non-aqueous electrolyte secondary batteries represented by lithium ion secondary batteries are misused, for example, externally short-circuited or overcharged, the battery temperature might increase abruptly. In view of this, a safety mechanism such as a positive temperature coefficient (PTC) element or a safety unit (SU) circuit is incorporated so that the safety of the battery can be ensured. In addition, a function of shutting down current flow in response to an increase in the battery temperature (i.e., a shutdown function) is imparted to a separator interposed between the electrodes in the battery.

A commonly used separator for a non-aqueous electrolyte secondary battery is a polyolefin porous film. When the battery temperature increases to a certain temperature, the polyolefin porous film softens to close the pores therein. As a result, the ion conductivity between the electrodes is lost, and the battery reaction is stopped. Such function is known as a shutdown function. Despite this, if the battery temperature increases even after the shutdown, the polyolefin might be damaged by melting (meltdown), causing a short circuit between the positive and negative electrodes.

The shutdown for ensuring the safety and the meltdown causing a short circuit are both caused by the softening or melting by heat of a resin constituting the separator. It is very difficult, therefore, to prevent the meltdown effectively, while improving the shutdown function. In order to solve this, for example, a composite film formed by combining a polyolefin porous film with a highly heat-resistant layer is being developed.

With respect to non-aqueous electrolyte secondary batteries required to have excellent output/input characteristics, they are expected to have an ability to be rapidly charged. In order to ensure a sufficient capacity retention rate in charge/discharge cycles for rapidly charging the battery, it is necessary to improve the movability of lithium ions between the electrodes. However, in order to improve the movability, if the pore diameter of the separator is simply increased, the growth of needle-like metal lithium (dendrites) is facilitated, and an internal short circuit tends to occur. If the dendrites are dissociated, the capacity of the battery is reduced, or the pores in the separator are clogged. Alternatively, if the porosity is simply increased, the tensile strength or the piercing strength of the separator is lowered, or the handleability of the separator is degraded.

In view of the above, various proposals have been made with regard to the structure of the separator.

Patent Literature 1 discloses that a fluorocarbon resin raw material such as polytetrafluoroethylene be stretched at a high temperature of about 300° C., to produce a separator having nodes extending in the film thickness direction. Patent Literature 1 teaches that the nodes extending in the film thickness direction improve the compression strength of the separator and suppress the formation or dissociation of dendrites.

Patent Literature 2 discloses that a non-oriented polyolefin resin layer be laminated on at least one surface of a biaxially-oriented polypropylene porous film. Patent Literature 2 teaches that this can improve the handleability of the film while maintaining its excellent air permeability and high porosity.

Patent Literature 3 discloses a separator comprising a polyolefin resin including a high-molecular-weight polyethylene having an average molecular weight of 500,000 or more and a polyethylene having an average molecular weight of less than 500,000. Patent Literature 3 teaches that by using such a polyolefin resin, the shutdown temperature can be lowered while the piercing strength is maintained, and the shrinkage percentage when shutdown occurs can be reduced.

CITATION LIST

Patent Literature

[PTL 1] Japanese Laid-Open Patent Publication No. Hei 8-7925
[PTL 2] Japanese Laid-Open Patent Publication No. 2009-226746
[PTL 3] Japanese Laid-Open Patent Publication No. 2002-367589

SUMMARY OF INVENTION

Technical Problem

However, in the case of using a fluorocarbon resin as a raw material and stretching it at a high temperature as in Patent Literature 1, the material costs and production costs of the separator are increased. Moreover, because of the excellent heat resistance of the fluorocarbon resin, it is difficult to obtain effective shutdown effect.

In the case of simply laminating films having different orientations as in Patent Literature 2, it is difficult to control the pore structure of the film. However, for rapidly charging the battery, it is necessary to improve the movability of lithium ions between the electrodes, and, therefore, a pore structure suitable for movement of lithium ions must be achieved.

Even in the case of using a polyolefin resin including polyethylenes having different average molecular weights and controlling the piercing strength of the separator and the shutdown temperature as in Patent Literature 3, it is difficult to achieve a pore structure suitable for movement of lithium ions.

The present invention is made in view of the above problem, and one of the purposes thereof is to provide a non-aqueous electrolyte secondary battery exhibiting a favorable capacity retention rate in charge/discharge cycles for rapidly charging the battery.

Solution to Problem

One aspect of the present invention relates to a separator for a non-aqueous electrolyte secondary battery, the separator including a biaxially-oriented polyolefin porous film including extended-chain crystals and folded-chain crystals, wherein the extended-chain crystals and the folded-chain crystals form a shish-kebab structure. The average distance between the extended-chain crystals adjacent to each other is 1.5 μm or more and less than 11 μm, and the average distance between the folded-chain crystals adjacent to each other is 0.3 μm or more and less than 0.9 μm.

The extended-chain crystals adjacent to each other may be jointed to each other through the folded-chain crystals.

Another aspect of the present invention relates to a separator for a non-aqueous electrolyte secondary battery, the separator including the above-mentioned polyolefin porous film and a heat resistant porous film laminated on the polyolefin porous film. The heat resistant porous film includes a heat resistant resin having a melting point higher than a melting point of the polyolefin.

Yet another aspect of the present invention relates to a non-aqueous electrolyte secondary battery including: a spirally-wound electrode group including a positive electrode, a negative electrode, and the above-mentioned separator interposed between the positive electrode and the negative electrode; and a non-aqueous electrolyte.

Advantageous Effects of Invention

According to the present invention, it is possible to provide a separator having a pore structure suitable for movement of lithium ions, and thus to provide a non-aqueous secondary battery exhibiting a favorable capacity retention rate in charge/discharge cycles for rapidly charging the battery.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
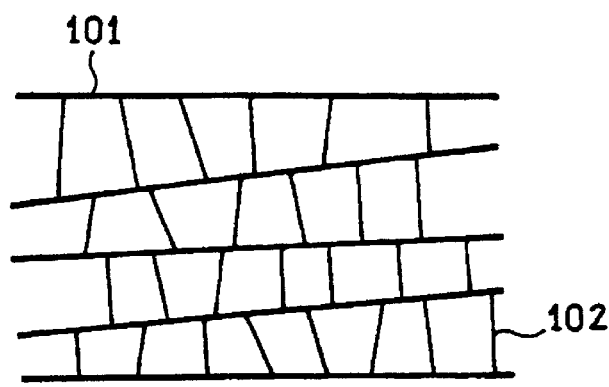
[FIG. 1] A schematic diagram showing one example of the pore structure of a separator for a non-aqueous electrolyte secondary battery of the present invention.

A separator for a non-aqueous electrolyte secondary battery of the present invention includes a biaxially-oriented polyolefin porous film. It is possible to impart the polyolefin porous film with a shutdown function to close the pores under an abnormal condition of the battery, at an upper limit temperature effective to ensure the safety. The biaxially-oriented polyolefin porous film has a high degree of orientation, and therefore, a separator having a high mechanical strength can be readily obtained.

The polyolefin porous film according to the present invention includes so-called extended-chain crystals and folded-chain crystals. The extended-chain crystals are formed of extended molecules without being folded. Such crystals are formed when polyolefin is highly stretched and becomes fibrous. The folded-chain crystals are lamellar plate-like crystals in which molecules having been folded on the upper and lower sides of the plate-like crystals are incorporated. Since the same molecule is folded repeatedly a plurality of times, the thickness of the plate-like crystal is smaller than the molecular chain length (the length of molecule).

The extended-chain crystals and folded-chain crystals constitute a so-called shish-kebab structure. In the shish-kebab structure, the extended-chain crystals are rod-like crystals oriented in a first direction corresponding to the orientation direction of molecules. The folded-chain crystals are plate-like crystals whose planes are oriented so as to cross the first direction. The average crossing angle a between the first and second directions is, for example, 30° to 150°, and preferably 70° to 110°.

The plate-like crystals are formed periodically along the axis direction of the rod-like crystal, like a shish kebab. The rod-like crystals adjacent to each other may be jointed to each other through plate-like crystals extending in the diameter direction of the rod-like crystals. In other words, the extended chain crystals adjacent to each other may be jointed to each other through the folded-chain crystals.

The average distance between the extended-chain crystals adjacent to each other (i.e., the axis-to-axis distance between the rod-like crystals) is 1.5 μm or more and less than 11 μm. The average distance may be of any range as long as it falls within the foregoing range. A preferable range is, for example, 3.5 μm or more and less than 7.5 μm. The lower limit of the average distance is not limited to 1.5 μm, and may be, for example, 3.5 μm, 5 μm or 7.5 μm. The upper limit of the average distance is not limited to 11 μm, and may be, for example, 7.5 μm, 5 μm or 3 μm. These upper limit values may be optionally combined with these lower limit values.

The average distance between the folded-chain crystals adjacent to each other (i.e., the thicknesswise center-to-center distance between the plate-like crystals) is 0.3 μm or more and less than 0.9 μm. The average distance may be of any range as long as it falls within the foregoing range. A preferable range is, for example, 0.5 μm or more and less than 0.9 μm. The lower limit of the average distance is not limited to 0.3 μm, and may be, for example, 0.5 μm or 0.7 μm. The upper limit of the average distance is not limited to 0.9 μm, and may be, for example, 0.7 μm or 0.5 μm. These upper limit values may be optionally combined with these lower limit values.

As mentioned above, the average distances between the adjacent extended-chain crystals and between the adjacent folded-chain crystals are respectively controlled within an appropriate range. This provides a uniform space distribution in the microstructure of the polyolefin porous film. As a result, the ability of the separator to retain non-aqueous electrolyte is enhanced, and the movability of lithium ions between the electrodes is improved. Consequently, the formation or dissociation of dendrites can be suppressed. For this reason, a high capacity retention rate can be obtained even when charge/discharge cycles for rapid charging are repeated.

Further, since the average distances between the adjacent extended-chain crystals and between the adjacent folded-chain crystals are controlled as mentioned above, each of the molecular chain crystals are aligned, and the degree of biaxial orientation is considerably increased. As such, the mechanical strength of the separator is effectively enhanced. Further, the shrinkage percentage at high temperatures and the shrinkage percentage when shutdown occurs of the polyolefin porous film are lowered, and therefore, an internal short circuit can be effectively prevented. As a consequence, a non-aqueous electrolyte secondary battery with improved safety can be provided.

Smaller variations in the distance between the adjacent extended-chain crystals and in the distance between the adjacent folded-chain crystals are considered to result in a more uniform space distribution in the microstructure. This is considered to enhance the effects, such as the effects to improve the electrolyte-retention ability of the separator, increase the mechanical strength, and lower the shrinkage percentage of the separator as a whole at the time of shutdown.

The average distances between the adjacent extended-chain crystals and between the adjacent folded-chain crystals can be measured by observing the microstructure of a polyethylene porous film under an electron microscope at a magnification of 10,000 times. For example, on an electron micrograph, a pair of adjacent extended-chain crystals and a pair of adjacent folded-chain crystals are picked out. As for the distance between the extended-chain crystals, the distance between the center positions of the crystals is measured every 0.5 μm in a straight line, along the orientation direction of the extended-chain crystals (the first direction). As for the distance between the folded-chain crystals, the distance between the center positions of the crystals is measured every 0.1 μm in a straight line, along the orientation direction of the plate-like crystal plane (the second direction). Measurement is made at 50 points per one visual field for each of the crystals. From the measured values in three visual fields (at 150 points in total), an average value is calculated. In measuring the distance between the extended-chain crystals, for example, the points at which a line perpendicular to the first direction intersects with a pair of extended-chain crystals are determined, and then a distance between the determined points of intersection is measured. In measuring the distance between the folded-chain crystals, for example, the points at which a line perpendicular to the second direction intersects with a pair of folded-chain crystals are determined, and then a distance between the determined points of intersection is measured.

In the electron micrograph taken at a magnification of 10,000 times as mentioned above, when a straight line segment PQ is drawn from a point P on an extended-chain crystal to a point Q away from the point P by a distance of a length $L1$ along the first direction, the ratio $L2/L1$ of an actual length $L2$ of the extended-chain crystal from the point P to a point R (where the point R is a point at which a line passing through the point Q perpendicular to the line segment PQ intersects with the extended-chain crystal) to a distance $L1$ of the line segment PQ (e.g., 5 μm) is preferably closer to 1 (one).

The average value of $L2/L1$ determined when $L2/L1$ is measured at 30 points in three visual fields (i.e., at 10 points per one visual field) is preferably within the range, for example, from 1.1 to 1.5. In the case where such an average value of $L2/L1$ is obtained, the variations in the distance between the adjacent extended-chain crystals and the distance between the adjacent folded-chain crystals are considered to be extremely small, and the space distribution in the microstructure is considered to be highly uniform.

In one embodiment, the separator of the present invention includes the above-mentioned polyolefin porous film, and a heat resistant porous film laminated on the polyolefin porous film. The heat resistant porous film includes a heat resistant resin having a melting point higher than that of the polyolefin. By using such a separator, even when the battery temperature exceeds the shutdown temperature of the polyolefin porous film, the occurrence of a short circuit due to meltdown of the separator can be prevented.

Further, by using a laminated film composed of a polyolefin porous film and a heat resistant porous film, the shrinkage percentage of the separator when shutdown occurs in the polyolefin porous film can be further lowered than by using a film composed of a polyolefin porous film only. Hence, the safety of the battery can be further improved.

The temperature at which shutdown occurs in the polyolefin porous film is within the range of, for example, 120 to 150° C. Therefore, the heat resistant resin preferably has heat resistance or a melting point higher than this temperature. The heat resistance can be evaluated by a heat distortion temperature.

By adjusting $L2/L1$ to close to 1 (one), the shrinkage percentage of the two-layer separator comprising a polyolefin porous film and a heat resistant porous film when shutdown occurs in the polyolefin porous film can be lowered to 10% or less. A more preferable range of this shrinkage percentage is from 5 to 8%. It is considered that, in addition to by controlling the average distance between the adjacent molecular chain crystals as mentioned above, by reducing the variations in the distance between the adjacent molecular chain crystals, and further by using a laminated film including a heat resistant porous film as the separator, a very small shrinkage percentage can be attained.

A method of measuring the shrinkage percentage of the two-layer separator comprising a polyolefin porous film and a heat resistant porous film is described below.

The shrinkage percentage is measured by a TMA method. First, a separator sample of 5 mm×14 mm in size is prepared. The sample is set in a tensile load tester (a thermomechanical analyzer (TMA), RIGAKU ThermoPlus 2). The upper and lower ends of the sample are clamped with a jig by 2 mm each, and accordingly, the actually measured size of the sample is 5 mm×10 mm. While the sample is pulled with a load of 19.6 mN in air, the temperature of the sample was increased at a rate of 10° C./min from room temperature to 250° C., to measure the changes in length. The sample starts shrinking at a temperature just below the shutdown temperature of the polyolefin porous film. The shrinkage of the sample reaches its maximum at a temperature shortly after the temperature of the sample exceeds the shutdown temperature. Thereafter, the sample gradually restores it original length (10 mm). The ratio of a length at the maximum shrinkage to the original length (10 mm) is calculated as a shrinkage percentage.

The Gurley value of the separator of the present invention is, for example, 180 sec/100 ml or more and less than 260 sec/100 ml. The porosity of the separator of the present invention is, for example, 50% or more and less than 62%. The Gurley value and the porosity of the separator within the foregoing range are not only advantageous for rapid charging, but also effective in reducing the variations in battery characteristics.

The separator for a non-aqueous electrolyte secondary battery of the present invention is more specifically described below.

The biaxially-oriented structure composed of extended-chain crystals and folded-chain crystals in the separator of the present invention is formed by fluid orientation of a solution of a high molecular weight polyolefin or fluid orientation of a melt of a high molecular weight polyolefin. For example, by stretching a high molecular weight polyethylene at a temperature higher than its melting point, a porous film having a shish-kebab structure can be formed. The melting point of extended-chain crystals is high, whereas the melting point of folded-chain crystals is low. In the porous film having a shish-kebab structure, biaxially-oriented these two crystals are combined in layers.

FIG. 1 is a schematic diagram showing one example of the pore structure of the separator for a non-aqueous electrolyte secondary battery of the present invention. In the polyolefin porous film shown in FIG. 1, extended-chain crystals 101 are oriented and aligned in the machine (MD) direction (the stretching direction), and folded-chain crystals 102 are oriented and aligned in the transverse (TD) direction (the direction perpendicular to the machine direction). In the folded-chain crystals 102, molecules are folded, and therefore, the length of the molecular chain crystal is small. The folded-chain crystals 102 form a bridge structure, joining the extended-chain crystals 101 to each other.

FIG. 1 schematically shows one plane inside the separator along the plane direction thereof, and in an actual separator, planes having such a structure are superimposed. In a battery, lithium ions pass through the non-aqueous electrolyte retained in the space between these molecular chain crystals, whereby ion conductivity is achieved.

The average distance between the adjacent extended-chain crystals 101 is 1.5 µm or more and less than 11 µm, and the average distance between the adjacent folded-chain crystals 102 is 0.3 µm or more and less than 0.9 µm. Such an arrangement of each of the molecular chain crystals with an appropriate distance therebetween on one plane provides a three-dimensional structure in which the molecular chain crystals are aligned. Since lithium ions can move smoothly through the non-aqueous electrolyte retained in such a microstructure, the ion conduction is not inhibited even during rapid charging, and the growth or dissociation of dendrites and further the occurrence of troubles such as a short circuit can be significantly suppressed.

Figure 2:
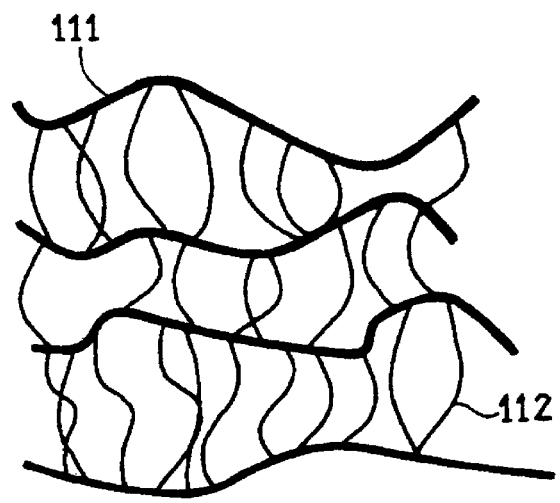
[FIG. 2] A schematic diagram showing another example of the pore structure of the separator for a non-aqueous electrolyte secondary battery of the present invention.

FIG. 2 shows a schematic diagram showing another example of the pore structure of the separator for a non-aqueous electrolyte secondary battery of the present invention. In the polyolefin porous film shown in FIG. 2 also, extended-chain crystals 111 are orientated in the MD direction, and folded-chain crystals 112 are oriented in the TD direction, forming a structure similar to that shown in FIG. 1, except that the extended-chain crystals 111 and the folded-chain crystals 112 have more bending portions than in the structure shown in FIG. 1.

In FIG. 2, for example, the distance between a specific folded-chain crystal and another folded-chain crystal adjacent thereto is decreased and increased. Accordingly, the variations in the distance between the molecular chain crystals (i.e., L2/L1) are comparatively large, and portions through which lithium ions can move smoothly and portions through which lithium ions cannot move smoothly are present at random. In other words, there is a possibility that the conduction of lithium ions is partially inhibited, and therefore, the effect to suppress the growth of dendrites is small as compared to in the separator as shown in FIG. 1. Such a trend becomes particularly evident in charge/discharge cycles for rapid charging, and for this reason, the variations in the distance between the molecular chain crystals are desirably as small as possible. It should be noted that the variations in the distance between the molecular chain crystals can be evaluated not only directly from L2/L1, but also indirectly from, for example, the shrinkage percentage of the separator.

The structure as shown in FIG. 1 or 2 can be identified by observing the microstructure of the separator under an electron microscope. By observing the polyolefin porous film as it is under an electron microscope, the structure at the outermost surface can be identified. The inner structure of the separator can be identified by observing a surface exposed by, for example, partially exfoliating the separator, or freezing and slicing the separator. Among these, the method of freezing and slicing is preferable because the inner structure is unlikely to be destroyed.

An exemplary method of producing a polyolefin porous film having a structure as shown in FIG. 1 is described below.

Examples of a polyolefin constituting the polyolefin porous film include polyethylene, polypropylene, and ethylene-propylene copolymer. These resins may be used singly or in combination of two or more. For example, in view of achieving uniform mixing and higher density, a first polyethylene having an average molecular weight of 2,500,000 or more and a second polyethylene having an average molecular weight of less than 2,000,000 may be used by mixing these using a stirrer-equipped apparatus such as a high-speed mixer. The mass ratio of the first polyethylene to the second polyethylene is, for example, 3:1 to 3:2.

In the case of using a mixture of a first polyethylene having an average molecular weight of 2,500,000 or more and a second polyethylene having an average molecular weight of less than 2,000,000, a processing aid or a lubricant is added to the mixture and melt-blended until the whole becomes homogeneous. Thereafter, the homogenous mixture is extruded with an extruder, to form a polyethylene sheet. Subsequently, the polyethylene sheet is stretched at a temperature higher than a melting point of polyethylene (at a temperature within the range of about 135° C. to about 150° C.), to form a non-porous film.

Subsequently, in order to form pores in the non-porous film obtained by stretching, further stretching is performed to cause cleavage between the crystals in the non-porous film. The further stretching is performed dividedly in two or more times. In a method generally known as a roll stretching method, a film is passed through a pair of nip rollers rotating at different speeds, to stretch the film in the machine axis direction of the rollers. During stretching, cracks occur in the amorphous portion between the lamella crystals in the polyolefin resin. A biaxially oriented polyolefin porous film is thus obtained. Here, by adjusting the speed of stretching, the number of times of stretching, the rotation speed of the nip rollers, and the pressure between the nip rollers, the distances between the extended-chain crystals and between the folded-chain crystal can be controlled.

By changing the raw materials and the production process as needed, it is possible to produce polyolefin porous films having almost the same shish-kebab structure but having different Gurley values or different porosities. For example, by changing the first polyethylene and the second polyethylene as appropriate, changing the mixing conditions or extruding conditions of a mixture of the first polyethylene and the second polyethylene, or by changing the stretching conditions of the non-porous film, such polyolefin porous films can be produced. Further, by changing the state of the heat resistant porous film, the Gurley value or the porosity of the separator as whole can be controlled.

Next, an embodiment in which a heat resistant porous film is laminated on the polyolefin porous film is described.

Figure 3:
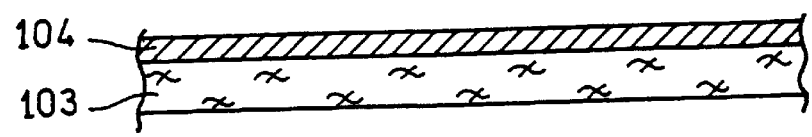
[FIG. 3] A cross-sectional view of a separator for a non-aqueous electrolyte secondary battery having a multilayer structure comprising a polyolefin porous film and a heat resistant porous film laminated thereon.

FIG. 3 is a cross-sectional view in the thickness direction of a two-layer separator comprising a polyolefin porous film 103 and a heat resistant porous film 104.

The heat resistant porous film 104 includes a heat resistant resin having heat resistance or a melting point higher than a melting point of the polyolefin porous film. In other words, the heat resistant resin is selected such that its melting point or heat distortion temperature is higher than that of the polyolefin included in the polyolefin porous film.

The heat distortion temperature can be measured as a deflection temperature under load. According to the test method ASTM-D648 standardized by the American Society for Testing and Materials, the deflection temperature under load is measured with a load of 1.82 MPa.

The heat distortion temperature of the heat resistant resin is preferably 260° C. or more. By using a heat resistant resin having a heat distortion temperature of 260° C. or more, sufficiently excellent thermal stability can be obtained even when the battery temperature is increased (usually to about 180° C.) due to the heat accumulated during overcharging. The upper limit of the heat distortion temperature is not particularly limited, but is about 400° C. in view of the characteristics of the separator and the thermal decomposition behavior of the resin. The higher the heat distortion temperature is, the more likely the shape of the separator is to be maintained when heat shrinkage or meltdown occurs in the polyolefin porous film.

Examples of the heat resistant resin include: polyarylate; aromatic polyamides (e.g., wholly aromatic polyamides), such as aramid; polyimide resins, such as polyimide, polyamide-imide, polyether imide, and polyester imide; aromatic polyesters, such as polyethylene terephthalate; polyphenylene sulfide; polyether nitrile; polyether ether ketone; and polybenzimidazole. These heat resistant resins may be used singly or in combination of two or more. Preferable examples among these include aramid, polyimide and polyamide-imide because these are excellent in the heat resistance as well as the ability to retain non-aqueous electrolyte.

The heat resistant porous film may further include an inorganic filler, so that the heat resistance thereof can be further improved. Examples of the inorganic filler include: metals or metal oxides, such as iron powder and iron oxide; ceramics, such as silica, alumina, titania, and zeolite; mineral-based fillers, such as talc and mica; carbon-based fillers, such as activated carbon and carbon fibers; carbides, such as silicon carbide; nitrides, such as silicon nitride; glass fibers; glass beads; and glass flakes. The inorganic filler may be in any form without particular limitation, and may be in the form of, for example, particles, powder, fibers, flakes or aggregates. These inorganic fillers may be used singly or in combination of two or more.

The ratio of the inorganic filler to 100 parts by mass of the heat resistant resin is, for example, 50 to 400 parts by mass, and preferably 80 to 300 parts by mass. The larger the amount of the inorganic filler is, the higher the hardness and friction coefficient of the heat resistant porous film are. As such, there is a possibility that the slippage and handleability is degraded.

The method of laminating a heat resistant porous film on the polyolefin porous film includes a method of coating the polyolefin porous film with a solution or dispersion of a material for the heat resistant porous film, and a method of bonding a heat resistant porous film which has been produced beforehand, to the polyolefin porous film. In coating, in addition to the heat resistant resin such as aramid, an inorganic filler may be added to the solution or dispersion of a material for the heat resistant porous film, or a pore-forming agent such as calcium chloride may be added thereto, as needed. The solution or dispersion of a material for the heat resistant porous film may be applied onto a surface of the polyolefin porous film, and then dried, as needed.

In the case of using polyimide or polyamide-imide as the heat resistant resin, a two-layer separator can be formed, for example, as follows.

First, a polyamic acid solution is flow-casted, and then stretched to prepare a precursor of the heat resistant porous film. The polyolefin porous film is placed on the surface of the precursor of the heat resistant porous film, and heated to such a temperature at which the shutdown does not yet occur in the polyolefin porous film, to integrate the two. For such integration, for example, heated rollers are used. The heat from the heated rollers allows the imidization of polyamic acid to proceed, and the polyamic acid in the precursor of the porous film is converted into polyimide or polyamide-imide. If necessary, prior to integration with the polyolefin porous film, the precursor of the porous film containing polyamic acid may be heated, to convert the polyamic acid to polyamide or polyamide-imide. In such a method, the porosity of the heat resistant porous film can be controlled by changing the stretching conditions.

Examples of a solvent in which a material for the heat resistant porous film is to be dissolved or dispersed include: alcohols (e.g., C2-4 alkanol and C2-4 alkanediol), such as methanol, ethanol, and ethylene glycol; ketones, such as acetone; ethers, such as diethyl ether and tetrahydrofuran; amides, such as dimethylformamide; nitriles, such as acetonitrile; sulfoxides, such as dimethylsulfoxide; and N-methyl-2-pyrrolidone (NMP). These solvents may be used singly or in combination of two or more.

The thickness of the heat resistant porous film is preferably 1 to 16 µm, and more preferably 2 to 10 µm, in view of the balance between the safety against internal short circuits and the battery capacity. By setting the thickness of the heat resistant porous film within the foregoing range, short circuits can be readily prevented sufficiently when, for example, the polyolefin porous film is shrunk by heat at high temperatures. It should be noted that although the porosity and ion conductivity of the heat resistant porous film are comparatively low, an excessive increase in impedance can be readily prevented by setting the thickness of the heat resistant porous film to 20 µm or less, and hence the deterioration in charge/discharge characteristics can be suppressed.

The porosity of the heat resistant porous film is, for example, 20 to 70%, and more preferably 25 to 65%, in view of sufficiently ensuring the movability of lithium ions.

Figure 4:
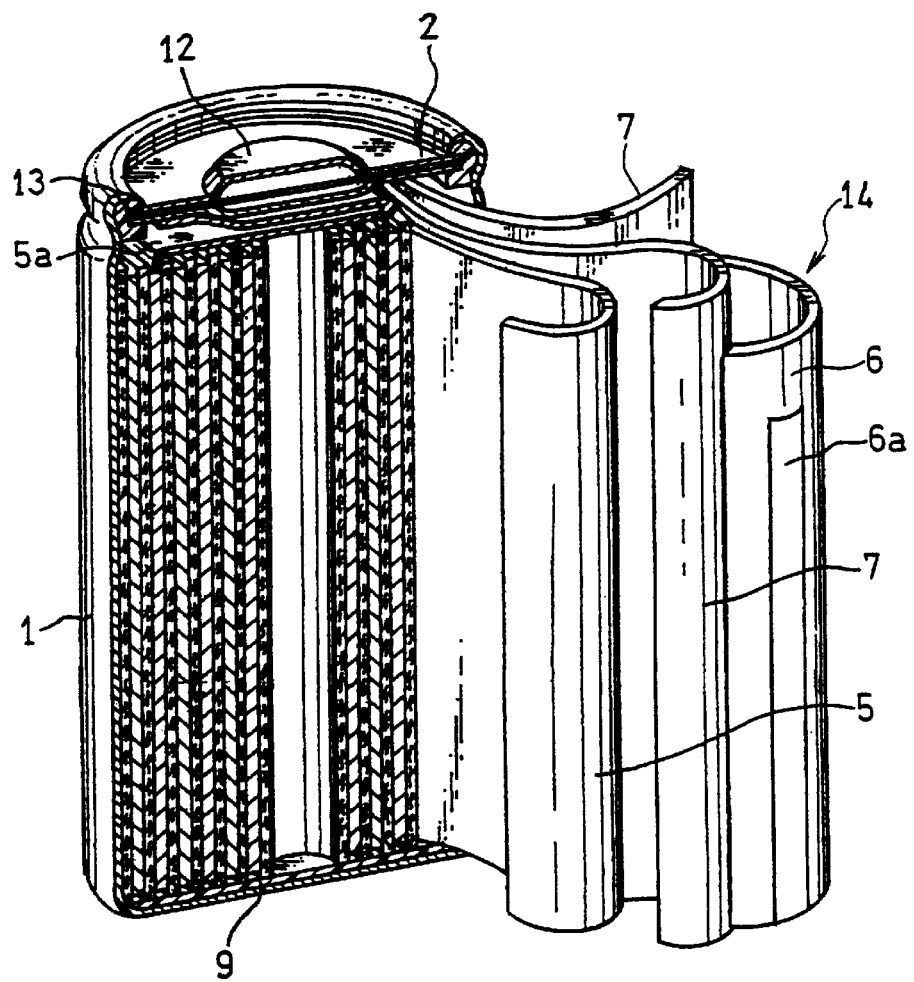
[FIG. 4] A partially cut-away oblique view showing one example of a non-aqueous electrolyte secondary battery of the present invention.

The Gurley value of the separator as a whole is preferably 180 sec/100 ml or more and less than 260 sec/100 ml, and the porosity thereof is preferably 50% or more and less than 62%. A more preferable range of the Gurley value is 180 sec/100 ml or more and less than 250 sec/100 ml, and a more preferable range of the porosity is 55% or more and less than 62%. These physical property values of the separator are those of the separator as a whole, and in the case of the separator having a layered structure as shown in FIG. 4, are those of the separator as a whole including the heat resistant porous film.

The thickness of the separator as a whole is within the range, for example, from 5 to 35 µm, is preferably 10 to 30 µm, and may be 12 to 20 µm. By setting the thickness of the separator within the foregoing range, it is possible to readily prevent minor short circuits inside the battery effectively, and to allow the positive and negative electrodes to have a sufficient thickness. As such, a safe battery with high capacity can be readily provided.

In the case of a two-layer separator as shown in FIG. 3, the ratio $T_{po}/T_{ht}$ of a thickness $T_{po}$ of the polyolefin porous film to a thickness $T_{ht}$ of the heat resistant porous film is preferably set to 4 to 9. By controlling the thickness of each layer within the foregoing range, the effect of the polyolefin porous film and the effect of the heat resistant porous film can be obtained in a balanced manner. For example, the effect of the heat resistant porous film to improve the safety can be sufficiently obtained, without impairing the effect of the polyolefin porous film to allow smooth movement of lithium ions even during rapid charging.

The separator may contain a commonly used additive (e.g., an antioxidant). For example, by allowing the surface layer of the polyolefin porous film to contain an antioxidant, the oxidation resistance of the polyolefin porous film can be improved. Such an antioxidant may be at least one selected from the group consisting of a phenolic antioxidant, a phosphoric acid-series antioxidant, and a sulfur-containing antioxidant. A phenolic antioxidant may be used in combination with a phosphoric acid-series antioxidant or a sulfur-containing antioxidant. A sulfur-containing antioxidant is highly compatible with polyolefin, and therefore, can be suitable used for the polyolefin porous film.

Examples of the phenolic antioxidant include hindered phenol compounds, such as 2,6-di-t-butyl-p-cresol, 2,6-di-t-butyl-4-ethylphenol, triethyleneglycol bis[3-(3-t-butyl-5-methyl-4-hydroxyphenyl)propionate], and n-octadecyl 3-(3,5-di-t-butyl-4-hydroxyphenyl)propionate. Examples of the sulfur-containing antioxidant include dilauryl thiodipropionate, distearyl thiodipropionate, and dimyristyl thiodipropionate. Preferred examples of the phosphoric acid-series antioxidant include tris(2,4-di-t-butylphenyl)phosphite.

Next, a non-aqueous electrolyte secondary battery including the separator of the present invention is described with reference to the appended drawing.

FIG. 4 is a partially cut-away oblique view of a cylindrical lithium ion secondary battery according to one embodiment of the present invention. A lithium ion secondary battery in FIG. 4 has an electrode group 14 including a belt-like positive electrode 5 and a belt-like negative electrode 6 which are wound with a separator 7 interposed therebetween. The electrode group 14 is accommodated together with a non-aqueous electrolyte (not shown) in a bottomed cylindrical battery case 1 made of a metal. The positive electrode 5 includes a positive electrode current collector made of a metal foil, and a positive electrode active material layer disposed on a surface thereof. The negative electrode 6 includes a negative electrode current collector made of a metal foil, and a negative electrode active material layer disposed on a surface thereof.

A positive electrode lead 5a is electrically connected to the positive electrode 5. A negative electrode lead 6a is electrically connected to the negative electrode 6. The electrode group 14 is inserted, together with a lower insulating plate 9, in the battery case 1, with the positive electrode lead 5a being outwardly extended therefrom. The end of the positive electrode lead 5a is welded to a sealing plate 2. The sealing plate 2 includes a positive electrode external terminal 12, and a safety mechanism comprising a PTC element and an anti-explosion vent (not shown).

The lower insulating plate 9 is interposed between the bottom surface of the electrode group 14 and the negative electrode lead 6a extended downward from the electrode group 14. The end of the negative electrode lead 6a is welded to the inner bottom surface of the battery case 1. On the top surface of the electrode group 14, an upper insulating ring (not shown) is mounted. In the upper portion of the battery case 1 above the upper insulating ring, an annular step portion is formed along the side surface of the battery case. The step portion allows the electrode group 14 to be securely placed in the battery case 1. Subsequently, a predetermined amount of non-aqueous electrolyte is injected into the battery case 1. The positive electrode lead 5a is bent and accommodated in the battery case 1. On the step portion, the sealing plate 2 with a gasket 13 disposed at the periphery thereof is mounted. The opening end of the battery case 1 is crimped inwardly, whereby a sealed cylindrical lithium ion secondary battery is obtained.

The electrode group 14 is formed by stacking the positive electrode 5, the separator 7, the negative electrode 6, and another separator 7 in this order, winding these spirally using a winding core (not shown), and then removing the winding core. Specifically, the components of the electrode group 14 (the positive electrode 5, the negative electrode 6, and the separators 7) are stacked, with the ends of the two separators 7 being protruded longer than the ends in the longitudinal direction of the positive and negative electrodes 5 and 6. The components of the electrode group 14 are wound, with the protruding ends of the separators 7 being clamped between a pair of winding cores. Several rounds from the start of winding (e.g., the 1st to 3rd rounds from the start of winding) may comprise only two separators 7.

The separator of the present invention is useful for forming a high capacity electrode group in which a separator is wound under a high tension together with a positive or negative electrode having a large amount of positive or negative electrode active material packed therein. Usually, in a battery including such an electrode group, there is little space where lithium ions can move, and because of this, the probability of dendrite formation and the degree of polarization tend to increase when the battery is rapidly charged. However, by using the separator of the present invention, the movability of lithium ions between the electrodes is improved, and therefore, the probability of dendrite formation and the degree of polarization are unlikely to increase.

A high capacity battery has a capacity density (a value obtained by dividing the nominal capacity of a battery by the mass of the battery) of, for example, 44,000 mAh/kg or more, or further 51,000 mAh/kg or more. The upper limit of the capacity density is about 75,000 mAh/kg. For example, a 18650-type high capacity cylindrical battery has a nominal capacity of 2,000 mAh or more, and preferably 2,300 mAh, and the above-described separator is suitably applicable thereto.

Although a cylindrical electrode group is described above with reference to FIG. 4, the wound electrode group may be a flat electrode group whose end surface perpendicular to the winding axis is oblong.

The non-aqueous electrolyte secondary battery may be charged by any method without particular limitation, but preferably is charged by a system including constant-current charging to a predetermined battery voltage $V_x$, and subsequent constant-voltage charging at the battery voltage $V_x$. The current value gradually drops during constant-voltage charging. Therefore, the constant-voltage charging is stopped when the current value has reached a predetermined value, or when a predetermined length of time has passed.

In the case of the non-aqueous electrolyte secondary battery including the separator of the present invention, constant-current charging can be performed at a higher current value, as compared to in the case of a general non-aqueous electrolyte secondary battery. For example, charging can be performed rapidly at a current value of an hour rate greater than 0.7 C or further of an hour rate greater than 0.8 C. Here, a current value of one hour rate (1 C) corresponds to a current value at which a capacity equivalent to the nominal capacity can be charged or discharged in one hour.

Next, the components other than the separator of the non-aqueous electrolyte secondary battery are specifically described below.

(Positive Electrode)

The positive electrode includes, for example, a sheet-like positive electrode current collector and a positive electrode active material layer disposed on a surface of the positive electrode current collector. The positive electrode current collector may be, for example, a metal foil of aluminum, an aluminum alloy, stainless steel, titanium, a titanium alloy, or the like. The material for the positive electrode current collector may be selected, as appropriate, in view of the processability, practical strength, adhesion with the positive electrode active material layer, electron conductivity, corrosion resistance, and other factors. The thickness of the positive electrode current collector is, for example, 1 to 100 µm, and preferable 10 to 50 µm.

The positive electrode active material layer contains a positive electrode active material, and may further contain, for example, a conductive agent, a binder, or a thickener as an optional component. The positive electrode active material may be, for example, a lithium-containing transition metal compound capable of receiving lithium ions as a guest. An example thereof is a composite metal oxide of lithium and at least one metal selected from the group consisting of cobalt, manganese, nickel, chromium, iron, and vanadium, and specific examples thereof include $LiCoO_2$, $LiMn_2O_4$, $LiNiO_2$, $LiCo_xNi_{1-x}O_2$ where $0<x<1$, $LiCo_yM_{1-y}O_2$ where $0.6 \leq y<1$, $LiNi_zM_{1-z}O_2$ where $0.6 \leq z<1$, $LiCrO_2$, $\alpha LiFeO_2$, and $LiVO_2$. In the above compositional formulae, M is at least one selected from the group consisting of Na, Mg, Sc, Y, Mn, Fe, Co, Ni, Cu, Zn, Al, Cr, Pb, Sb, and B. Preferably, M is at least one element selected from the group Mg and Al. These positive electrode active materials may be used singly or in combination of two or more.

The binder is not particularly limited, and may be any binder that can be solved or dispersed in a dispersion medium by kneading. Examples of the binder include fluorocarbon resin, rubbers, and acrylic polymer or vinyl polymer (a homo- or co-polymer of an acrylic monomer such as methyl acrylate or acrylonitrile, or of a vinyl monomer such as vinyl acetate). Examples of the fluorocarbon resin include polyvinylidene fluoride, a copolymer of vinylidene fluoride and hexafluoropropylene, and polytetrafluoroethylene. Examples of the rubbers include acrylic rubber, modified acrylonitrile rubber, and styrene-butadiene rubber (SBR). These binders may be used singly or in combination of two or more. The binder may be used in the form of dispersion in which the binder is dispersed in a dispersion medium.

Examples of the conductive agent include: carbon black, such as acetylene black, Ketjen black, channel black, furnace black, lamp black, and thermal black; graphites, such as natural graphite and artificial graphite; conductive fibers, such as carbon fibers and metal fibers.

A thickener may be added as needed. Examples of the thickener include ethylene-vinyl alcohol copolymer, and a cellulose derivative (e.g., carboxymethyl cellulose or methylcellulose).

The dispersion medium is not particularly limited, and may be any dispersion medium in which the binder can be dissolved or dispersed. Either an organic solvent or water (including warm water) may be used depending on the affinity of the binder to the dispersion medium. Examples of the organic solvent include: N-methyl-2-pyrrolidone; ethers, such as tetrahydrofuran; ketones, such as acetone, methyl ethyl ketone, and cyclohexanone; amides, such as N,N-dimethylformamide and dimethylacetamide; sulfoxides, such as dimethylsulfoxide; and tetramethylurea. These dispersion mediums may be used singly or in combination of two or more.

The positive electrode active material layer can be formed by kneading a positive electrode active material, and as needed, a binder, a conductive agent and/or a thickener, together with a dispersion medium to disperse them in the dispersion medium, thereby to prepare a material mixture in the form of slurry, and allowing the material mixture to adhere to the positive electrode current collector. Specifically, the material mixture is applied onto a surface of the positive electrode current collector by a known coating method, dried and then rolled as needed, whereby the positive electrode active material layer is formed. The surface of the positive electrode current collector is provided with a portion where no positive electrode active material layer is formed and the current collector is exposed, the portion serving as a portion for connecting a positive electrode lead thereto. The positive electrode is preferably excellent in flexibility.

The material mixture can be applied using a known coater, such as a slit die coater, reverse roll coater, lip coater, blade coater, knife coater, gravure coater, or dip coater. The drying after application is preferably performed under the conditions approximate to natural drying, but may be performed at a temperature ranging from 70° C. to 200° C. for 10 minutes to 5 hours, in view of the productivity. The rolling of the active material layer can be performed by, for example, repeating rolling two or more times with a roll press machine until a predetermined thickness is obtained, with the line pressure set at 1,000 to 2,000 kgf/cm (19.6 kN/cm). The line pressure may be changed, as needed, to perform the rolling.

In kneading into a material mixture in the form of slurry, for example, various dispersants, surfactants, and stabilizers may be added as needed.

The positive electrode active material layer may be formed on one surface or both surfaces of the positive electrode current collector. The density of the active material in the positive electrode active material layer is, in the case of using a lithium-containing transition metal compound as the active material, 3 to 4 g/ml, and preferably 3.4 to 3.9 g/ml or 3.5 to 3.7 g/ml.

The thickness of the positive electrode is, for example, 70 to 250 µm, and preferably 100 to 210 µm.

(Negative Electrode)

The negative electrode includes, for example, a sheet-like negative electrode current collector and a negative electrode active material layer disposed on a surface of the negative electrode current collector. The negative electrode current collector may be, for example, a metal foil of copper, a copper alloy, nickel, a nickel alloy, stainless steel, aluminum, an aluminum alloy, or the like. A preferable negative electrode current collector is a metal foil such as a copper foil or a copper alloy foil, in view of the processability, practical strength, adhesion with the negative electrode active material layer, electron conductivity, and other factors. The current collector may be of any form without particular limitation, and may be, for example, in the form of a rolled foil or an electrolytic foil, or in the form of a perforated foil, an expanded material, or a lath. The thickness of the negative electrode current collector is, for example, 1 to 100 µm, and preferably 2 to 50 µm.

The negative electrode active material layer contains a negative electrode active material, and may further contain, for example, a conductive agent, a binder, or a thickener. The negative electrode active material may be a material having a graphite-like crystal structure capable of reversibly absorbing and releasing lithium ions, for example, a carbon material, such as natural graphite, spherical or fibrous artificial graphite, non-graphitizable carbon (hard carbon), or graphitizable carbon (soft carbon). Particularly preferred is a carbon material having a graphite-like crystal structure in which the interplanar spacing (d002) between the (002) lattice planes is 0.3350 to 0.3400 nm. Further examples of the negative electrode active material include silicon; silicon-containing compounds, such as silicide; lithium alloys or various alloy materials containing at least one selected from tin, aluminum, zinc, and magnesium.

An example of silicon-containing compounds is a silicon oxide $SiO_x$ where $0.05<\alpha<1.95$. The value a is preferably 0.1 to 1.8, and more preferably 0.15 to 1.6. In the silicon oxide, silicon may be partially replaced with one element or two or more elements. Examples of such elements include B, Mg, Ni, Co, Ca, Fe, Mn, Zn, C, N, and Sn.

Examples of the binder, conductive agent, thickener and dispersion medium include those listed for the positive electrode.

The negative electrode active material layer can be formed by a known method, without being limited to the above-exemplified coating method using a binder and other optional components. For example, it may be formed by depositing a negative electrode active material by a vapor phase method such as vacuum vapor deposition, sputtering, or ion plating. Alternatively, it may be formed by the method similar to that of forming the positive electrode active material layer, using a material mixture in the form of slurry including a negative electrode active material, a binder, and as needed, a conductive material.

The negative electrode active material layer may be formed on one surface or both surfaces of the negative electrode current collector. The density of the active material in the negative electrode active material layer is, in the case of using a material mixture including a carbon material as the active material, 1.3 to 2 g/ml, preferably 1.4 to 1.9 g/ml, and more preferably 1.5 to 1.8 g/ml.

The thickness of the negative electrode is, for example, 100 to 250 μm, and preferably 110 to 210 μm.

The negative electrode preferably has flexibility.

(Non-Aqueous Electrolyte)

The non-aqueous electrolyte is prepared by dissolving a lithium salt in a non-aqueous solvent. Examples of the non-aqueous solvent include: cyclic carbonates, such as ethylene carbonate, propylene carbonate, and butylene carbonate; chain carbonates, such as dimethyl carbonate and diethyl carbonate; lactones, such as γ-butyrolactone; halogenated alkanes, such as 1,2-dichloroethane; alkoxyalkanes, such as 1,2-dimethoxyethane and 1,3-dimethoxypropane; ketones, such as 4-methyl-2-pentanone; ethers, such as 1,4-dioxane, tetrahydrofuran, and 2-methyltetrahydrofuran; nitriles, such as acetonitrile, propionitrile, butyronitrile, valeronitrile, and benzonitrile; sulfolanes, such as 3-methyl-sulfolane; amides, such as dimethylformamide; sulfoxides, such as dimethylsulfoxide; and alkyl phosphate esters, such as trimethylphosphate and triethylphosphate. These non-aqueous solvent may be used singly or in combination of two or more.

Examples of the lithium salt include a lithium salt with strong electron-withdrawing ability, such as $LiPF_6$, $LiBF_4$, $LiClO_4$, $LiAsF_6$, $LiCF_3SO_3$, $LiN(SO_2CF_3)_2$, $LiN(SO_2C_2F_5)_2$, and $LiC(SO_2CF_3)_3$. These lithium salts may be used singly or in combination of two or more. The concentration of the lithium salt in the non-aqueous electrolyte is, for example, 0.5 to 1.5 M, and preferably 0.7 to 1.2 M.

The non-aqueous electrolyte may further include an additive, as needed. For example, in order to form a favorable coating film on the positive and negative electrodes, vinylene carbonate (VC), cyclohexylbenzene (CHB), or a modified form of VC or CHB may be added. As an additive that acts when the lithium ion secondary battery falls in an overcharged state, for example, terphenyl, cyclohexylbenzene, or diphenyl ether may be added. These additives may be used singly or in combination of two or more. The ratio of the additive(s) is not particularly limited, but is, for example, about 0.05 to 10 mass % relative to the non-aqueous electrolyte.

The battery case may be, for example, a cylindrical or prismatic case with an open upper end, and is preferably made of, for example, an aluminum alloy containing a small amount of metal such as manganese or copper, or an inexpensive nickel-plated steel sheet, in view of the pressure resistant strength.

The separator of the present invention can be preferably used in a high capacity battery, such as a 18650-type cylindrical battery.

Examples of the present invention are described below. It should be noted that the description here merely relates to illustrative examples of the present invention, and the present invention is not limited thereto.

In Examples, a cylindrical lithium ion secondary battery similar to that described with reference to FIG. 4 was fabricated.

Example 1

(1) Production of Positive Electrode 5

To an appropriate amount of N-methyl-2-pyrrolidone, 100 parts by mass of lithium cobalt oxide serving as the positive electrode active material, 2 parts by mass of acetylene black serving as the conductive agent, and 3 parts by mass of polyvinylidene fluoride resin serving as the binder were added and kneaded, to prepare a material mixture in the form of slurry. The slurry was continuously applied onto both surfaces of a belt-like aluminum foil (thickness: 15 μm) serving as the positive electrode current collector. Here, a portion was left uncoated with the slurry, so that the portion can serve as an aluminum foil-exposed portion for connecting a positive electrode lead 5a thereto. The material mixture was dried, and films of the material mixture were rolled together with the positive electrode current collector two to three times at a line pressure of 1,000 kgf/cm (9.8 kN/cm) until the thickness of the films reached 180 μm, whereby positive electrode active material layers were formed. Thereafter, the current collector having the positive electrode active material layers on both surfaces thereof was cut in a size of 57 mm in width and 620 mm in length to produce a positive electrode 5. The density of the active material in the positive electrode active material layers was 3.6 g/ml.

The positive electrode lead 5a made of aluminum was ultrasonically welded to the aluminum foil-exposed portion where no material mixture was applied. An electrically insulating tape made of polypropylene resin was stuck on the ultrasonically welded portion so as to cover the positive electrode lead 5a.

(2) Production of Negative Electrode 6

To an appropriate amount of water, 100 parts by mass of flake graphite capable of absorbing and releasing lithium, serving as the negative electrode active material, 1 part by mass (solid basis) of an aqueous dispersion of styrene-butadiene rubber (SBR) serving as the binder, and 1 part by mass of sodium carboxymethylcellulose serving as the thickener were added and kneaded, to prepare a material mixture in the form of slurry. The slurry was continuously applied onto both surfaces of a belt-like copper foil (thickness: 10 μm) serving as the negative electrode current collector. Here, a portion was left uncoated with the slurry, so that the portion can serve as a copper foil-exposed portion for connecting a negative electrode lead 6a thereto. The material mixture was dried at 110° C. for 30 minutes, and films of the material mixture were rolled together with the negative electrode current collector two to three times at a line pressure of 110 kgf/cm (1.08 kN/cm) until the thickness of the films reached 174 μm, whereby negative electrode active material layers were formed. Thereafter, the current collector having the negative electrode active material layers on both surfaces thereof was cut in a size of 59 mm in width and 645 mm in length to produce a negative electrode 6. The density of the active material in the negative electrode active material layers was 1.6 g/ml.

The negative electrode lead 6a made of nickel was resistance-welded to the copper foil-exposed portion where no material mixture was applied. An electrically insulating tape made of polypropylene resin was stuck on the resistance-welded portion so as to cover the negative electrode lead 6a.

(3) Preparation of Separator 7

A polyethylene having an average molecular weight of 3,000,000 and a polyethylene having an average molecular weight of 1,000,000 were mixed in a ratio of 2:1 by mass in a high-speed mixer. Further, 0.3 mass % of diorganopolysiloxane serving as the processing aid and 0.15 mass % of stearic acid serving as the lubricant were added, and homogeneously melt-blended. The resultant mixture was extruded with an extruder, to form a polyethylene sheet. The resultant polyethylene sheet was stretched at 145° C., to form a non-porous film.

Subsequently, the non-porous film obtained in the above process was passed through a pair of nip rollers, to stretch the film in the machine axis direction of the rollers. In this process, the stretching speed, the number of times of stretching, the rotation speed of the nip rollers, and the pressure between the nip rollers were changed, to form various different products (polyethylene porous films). The thickness of each polyethylene porous film was 20 μm.

The polyethylene porous films thus formed were observed under an electron microscope at a magnification of 10,000 times, and the distances between the extended-chain crystals and between the folded-chain crystals were measured in one visual field. Specifically, a pair of adjacent extended-chain crystals and a pair of adjacent folded-chain crystals are picked out on the electron micrograph, and the distance between the center positions of each of the crystals measured every 0.5 μm for the extended-chain crystals (the straight line distance along the orientation direction of molecular chains), and every 0.1 μm for the folded-chain crystals (the straight line distance along the plane direction of plate-like crystals). The distance was measured at 50 points per one visual field for each of the crystals, and at 150 points in total in three visual fields, to calculate an average of the measured values.

Separators formed of the polyolefin porous films were classified into 12 classes according to the average values, as shown in Table 1. Each separator was cut in a long-sheet size of 60.9 mm in width, for use in formation of an electrode group.

The average value of L2/L1 measured at 30 points was, in the separators Nos. 4 and 9, within the range from 1.0 to 1.5; in the separators Nos. 5 and 8, within the range from 1.07 to 1.40; and in the separators Nos. 6 and 7, within the range from 1.05 to 1.35.

(4) Formation of Electrode Group 14

The positive electrode 5 and the negative electrode 6 were wound spirally with the separator 7 interposed therebetween, to form an electrode group 14. After the winding was finished, the separator was cut, and the clamping by a pair of winding cores was loosened, to remove the winding cores from the electrode group. The length of the separator in the electrode group was 700 to 720 mm.

(5) Fabrication of Non-Aqueous Electrolyte Secondary Battery

The electrode group 14 and a lower insulating plate 9 were placed in a cylindrical battery case 1 made of a metal (diameter: 17.8 mm, overall height: 64.8 mm) obtained by press-molding a nickel-plated steel sheet (thickness: 0.20 mm). The lower insulating plate 9 was interposed between the bottom surface of the electrode group 14 and the negative electrode lead 6a extended downward from the electrode group 14. The negative electrode lead 6a was resistance-welded to the inner bottom surface of the battery case 1.

An upper insulating ring was mounted on the top surface of the electrode group 14 accommodated in the battery case 1. An annular step portion was formed in the upper portion the battery case 1 above the upper insulating ring. A sealing plate 2 was laser-welded to the positive electrode lead 5a extended upward from the battery case 1, and then a non-aqueous electrolyte was injected into the battery case.

The non-aqueous electrolyte had been prepared by dissolving $LiPF_6$ at a concentration of 1.0 M in a mixed solvent of ethylene carbonate (EC) and ethyl methyl carbonate (EMC) (volume ratio 2:1), and adding thereto 0.5 mass % of cyclohexylbenzene.

Subsequently, the positive electrode lead 5a was bent and accommodated in the battery case 1, and on the step portion, the sealing plate 2 provided with a gasket 13 at the periphery thereof was mounted. The battery case 1 was sealed by crimping the opening end thereof inwardly, whereby a cylindrical lithium ion secondary battery was fabricated.

The fabricated battery was of 18650 type of 18.1 mm in diameter and 65.0 mm in height and had a nominal capacity of 2,600 mAh. The number of batteries fabricated for each class of the separator was 10, and a total of 120 batteries were fabricated.

The charge/discharge characteristics of the fabricated batteries were evaluated.

The charge/discharge test was performed in a 25° C. constant temperature bath. The charge was performed as a rapid charging at a 0.8 C charge rate. The discharge was performed at a 1 C discharge rate. The discharge capacity was measured every cycle. The charge/discharge cycle was performed 500 cycles in total, and an average capacity retention rate relative to the initial capacity of the battery after 500 cycles was determined. The evaluation results are shown in Table 1.

In Table 1, the samples Nos. 1, 2, 3, 10, 11 and 12 correspond to Comparative Examples.

TABLE 1

| Sample No. | Average distance between extended-chain crystals (μm) | Average distance between folded-chain crystals (μm) | Number of sample batteries fabricated (pcs) | Average capacity retention rate after 500 cycles (%) |
|---|---|---|---|---|
| 1 | 1.0 or more and less than 1.5 | 0.1 or more and less than 0.2 | 10 | 53.1 |
| 2 | 1.0 or more and less than 1.5 | 0.2 or more and less than 0.3 | 10 | 58.7 |
| 3 | 1.5 or more and less than 3.0 | 0.2 or more and less than 0.3 | 10 | 65.2 |
| 4 | 1.5 or more and less than 3.0 | 0.3 or more and less than 0.5 | 10 | 84.4 |
| 5 | 3.0 or more and less than 5.0 | 0.3 or more and less than 0.5 | 10 | 86.1 |
| 6 | 3.0 or more and less than 5.0 | 0.5 or more and less than 0.7 | 10 | 88.4 |
| 7 | 5.0 or more and less than 7.5 | 0.5 or more and less than 0.7 | 10 | 87.3 |
| 8 | 5.0 or more and less than 7.5 | 0.7 or more and less than 0.9 | 10 | 85.6 |
| 9 | 7.5 or more and less than 11.0 | 0.7 or more and less than 0.9 | 10 | 84.2 |
| 10 | 7.5 or more and less than 11.0 | 0.9 or more and less than 1.0 | 10 | 67.4 |
| 11 | 11.0 or more and less than 13.0 | 0.9 or more and less than 1.0 | 10 | 63.1 |
| 12 | 11.0 or more and less than 13.0 | 1.0 or more and less than 1.2 | 10 | 62.2 |

In the results shown in Table 1, a difference was observed in the cycle characteristics according to the range of the distance between extended-chain crystals and that of the distance between folded-chain crystals. The batteries using a separator in which the average distance between the adjacent extended-chain crystals was 1.5 μm or more and less than 11 μm and the average distance between the adjacent folded-chain crystals was 0.3 μm or more and less than 0.9 μm exhibited a favorable capacity retention rate after 500 cycles even though subjected to charge/discharge cycles for rapid charging.

Example 2

Batteries were fabricated in the same manner as in Example 1 except that the below-described separators were used.

First, various polyethylene porous films in which the average distance between adjacent extended-chain crystals was 3.0 μm or more and less than 5.0 μm and the average distance between adjacent folded-chain crystals was 0.5 μm or more and less than 0.7 μm (the same structure as that of No. 6 in Table 1) were fabricated. The thickness of the polyethylene porous film was set to 20 μm or 17 μm. With regard to the 20-μm-thick polyethylene porous films, the conditions of production process were changed as appropriate so that the resultant films had different Gurley values and porosities, while having the same structure as that of No. 6 in Table 1, and several types of polyethylene porous films were produced.

On the other hand, an NMP solution of aramid was applied onto one surface of each of the 17-μm-thick polyethylene porous films. In such a manner, two-layer separators comprising a polyolefin porous film and a heat resistant porous film were formed. The overall thickness of each two-layer separator was adjusted to 20 μm. With regard to the 17-μm-thick polyethylene porous films also, the conditions of production process were changed as appropriate so that the resultant films had the same structure as that of No. 6 in Table 1, and several types of polyethylene porous films were produced. In addition, the state of the aramid to be applied was changed as appropriate, so that the resultant films had different Gurley values and porosities, as needed.

Here, the 20-μm-thick separators composed of polyethylene porous film only (PE porous film) are classified as Separators A, and the two-layer separators composed of a polyolefin porous film and a heat resistant porous film (PE/PA porous film) are classified as Separators B.

The NMP solution of aramid had been prepared as follows. First, in a reaction bath, a predetermined amount of dry anhydrous calcium chloride was added to an appropriate amount of NMP, and heated to be dissolved completely. The calcium chloride-added NMP solution was brought back to room temperature, to which a predetermined amount of paraphenylendiamin (PPD) was added and dissolved completely. Subsequently, to the PPD-added solution, terephthalic acid dichloride (TPC) was slowly added dropwise to allow polymerization reaction to proceed, thereby to synthesize polyparaphenylene terephthalamide (PPTA). The solution after polymerization was stirred for 30 minutes under a reduced pressure to be degassed. The calcium chloride-added NMP solution was added again to the resultant polymerization solution to dilute it as appropriate, thereby to prepare an NMP solution of aramid.

The Gurley value and porosity of the produced separators were measured, and according to the measured values, Separators A and B were each classified into 11 classes (Nos. 13 to 23) as shown in Table 2. The number of batteries fabricated for each class of the separator was 10, and a total of 220 batteries were fabricated.

Specifically, the Gurley value (air permeability) of the separators was measured in accordance with JIS-P8117. The measuring apparatus was a digital Oken-type air permeability tester (available from Asahi Seiko Co. Ltd.). The separator was set in the apparatus, and the length of time for 100 ml of air to pass the separator was measured. Measurement was made at five different points, and calculated an average of the measured values.

The porosity of the separators was measured as follows. In the case of the single-layer film composed of a polyethylene porous film only, five sample pieces having an area of 6.0 cm×6.0 cm were cut out. The thickness and mass of these test pieces were measured, and from average values of five test pieces, a mass w per volume (g/cm$^3$) was calculated. Using the specific gravity s1 (g/cm$^3$) of polyethylene, a porosity V (%) was calculated from 100×(1−(w/s1)).

In the case of the two-layer separator composed of a polyethylene porous film and a heat resistance porous film, similarly to the above, five sample pieces having an area of 6.0 cm×6.0 cm were cut out, and the thickness and mass of the separator as a whole were measured. Thereafter, the heat resistance porous film was peeled off from each test piece to measure the thickness and mass of the remaining polyethylene porous film only. From these measured values, the thickness and mass of the polyethylene porous film and those of the heat resistance porous film were determined. From average values of five test pieces of the polyethylene porous film and those of the heat resistance porous film, a mass w1 per volume (g/cm$^3$) and a mass w2 per volume (g/cm$^3$) of each porous film were determined. Similarly to the above, using the specific gravity s1 (g/cm$^3$) of polyethylene and the specific gravity s2 (g/cm$^3$) of aramid, a porosity V1=100×(1−(w1/s1)) and a porosity V2=100×(1−(w2/s2)) were calculated. Further, using the thicknesses d1 and d2 of the polyethylene porous film and the heat resistance porous film, a porosity (%) Vt=V1×(d1/(d1+d2))+V2×(d2/(d1+d2)) of the film as a whole was calculated.

The non-aqueous electrolyte secondary batteries fabricated in the above were evaluated for charge/discharge characteristics in the same manner as in Example 1. The results are shown in Table 2 as an average capacity retention rate relative to the initial capacity of the battery after 500 cycles.

TABLE 2

| Sample No. | Gurley value (sec/100 ml) | Porosity (%) | Number of sample batteries fabricated (pcs) | Average capacity retention rate after 500 cycles (%) PE porous film (Separator A) | PE/PA porous film (Separator B) |
|---|---|---|---|---|---|
| 13 | 170 or more and less than 180 | 62 or more and less than 67 | 10 | 77.1 | 74.3 |
| 14 | 180 or more and less than 200 | 62 or more and less than 67 | 10 | 79.6 | 78.2 |
| 15 | 180 or more and less than 200 | 58 or more and less than 62 | 10 | 88.7 | 88.1 |
| 16 | 200 or more and less than 230 | 58 or more and less than 62 | 10 | 89.3 | 88.4 |
| 17 | 200 or more and less than 230 | 55 or more and less than 58 | 10 | 88.4 | 87.3 |
| 18 | 230 or more and less than 250 | 55 or more and less than 58 | 10 | 87.5 | 86.9 |
| 19 | 230 or more and less than 250 | 53 or more and less than 55 | 10 | 86.1 | 85.7 |
| 20 | 250 or more and less than 260 | 53 or more and less than 55 | 10 | 85.2 | 84.2 |
| 21 | 250 or more and less than 260 | 50 or more and less than 53 | 10 | 84.3 | 83.9 |
| 22 | 260 or more and less than 270 | 50 or more and less than 53 | 10 | 76.5 | 75.1 |
| 23 | 260 or more and less than 270 | 47 or more and less than 50 | 10 | 74.3 | 72.5 |

In the results shown in Table 2, a difference was observed in the cycle characteristics according to the ranges of the Gurley value and porosity. The batteries using a separator in which the Gurley value was 180 sec/100 ml or more and less than 260 sec/100 ml, and the porosity was 50% or more and less than 62% exhibited favorable characteristics.

Even when a separator including a heat resistant porous film was used, no deterioration in the cycle characteristics was observed, and the cycle characteristics were similarly excellent to when using a separator composed of a polyethylene porous film only. As a matter of course, by laminating the heat resistant resin, the safety was improved.

In addition, the shrinkage percentage of Separators B Nos. 13 to 23 was measured by the above-mentioned TMA method, and it was about 5.5% for all the separators. Further, the separators shown in Table 1 other than the separator No. 6 were used to produce Separators B having a two-layer structure composed of a polyethylene porous film and a heat resistance porous film, in a similar manner as above. The shrinkage percentage of these separators was measured by the same method as above. The results are shown in Table 3.

TABLE 3

| Polyethylene porous film shown in Table 1 | Shrinkage percentage (%) |
|---|---|
| No. 1 | 3.2 |
| No. 2 | 3.5 |
| No. 3 | 3.8 |
| No. 4 | 5.0 |
| No. 5 | 5.3 |
| No. 6 | 5.5 |
| No. 7 | 6.3 |
| No. 8 | 7.1 |
| No. 9 | 7.8 |
| No. 10 | 13 |
| No. 11 | 14 |
| No. 12 | 17 |

The foregoing results show that the separator of the present invention and the non-aqueous electrolyte secondary battery using the separator are excellent not only in cycle characteristics but also in safety.

Although a cylindrical lithium ion secondary battery was fabricated in Examples, similar effects can be obtained with a prismatic lithium ion secondary battery.

[Industrial Applicability]

The separator of the present invention is applicable to various non-aqueous electrolyte secondary batteries, but is particularly suitably applicable to a high capacity non-aqueous electrolyte secondary battery to be subjected to rapid charging.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

| [Reference Signs List] | |
|---|---|
| 1 | Battery case |
| 2 | Sealing plate |

| [Reference Signs List] | |
|---|---|
| 5 | Positive electrode |
| 5a | Positive electrode lead |
| 6 | Negative electrode |
| 6a | Negative electrode lead |
| 7 | Separator |
| 9 | Lower insulating plate |
| 12 | Positive electrode external terminal |
| 13 | Gasket |
| 14 | Electrode group |
| 101,111 | Extended-chain crystal |
| 102,112 | Folded-chain crystal |
| 103 | Polyolefin porous film |
| 104 | Heat resistant resin porous film |

The invention claimed is:

1. A separator for a non-aqueous electrolyte secondary battery, the separator comprising a biaxially-oriented polyolefin porous film including extended-chain crystals and folded-chain crystals, wherein:
the extended-chain crystals and the folded-chain crystals form a biaxially-oriented structure in which the extended-chain crystals are rod-like crystals oriented in a first direction corresponding to an orientation direction of molecules, and the folded-chain crystals are plate-like crystals whose planes are oriented so as to cross the first direction,
an average distance between the extended-chain crystals adjacent to each other is 1.5 μm or more and less than 11 μm, and
an average distance between the folded-chain crystals adjacent to each other is 0.3 μm or more and less than 0.9 μm.

2. The separator for a non-aqueous electrolyte secondary battery in accordance with claim 1, the separator further comprising a heat resistant porous film laminated on the polyolefin porous film, the heat resistant porous film including a resin having heat resistance or a melting point higher than a melting point of the polyolefin porous film.

3. The separator or a non-aqueous electrolyte secondary battery in accordance with claim 2, wherein
the polyolefin porous film has a shutdown function to close pores under an abnormal condition, and
a shrinkage percentage when shutdown occurs is 10% or less.

4. The separator for a non-aqueous electrolyte secondary battery in accordance with claim 2, wherein the heat resistant porous film includes 50 to 400 parts by mass of an inorganic filler per 100 parts by weight of the resin.

5. The separator for a non-aqueous electrolyte secondary battery in accordance with claim 1, the separator having a Gurley value of 180 sec/100 ml or more and less than 260 sec/100 ml, and a porosity of 50% or more and less than 62%.

6. The separator for a non-aqueous electrolyte secondary battery in accordance with claim 1, wherein the polyolefin porous film includes a mixture of a first polyethylene having an average molecular weight of 2,500,000 or more and a second polyethylene having an average molecular weight of less than 2,000,000.

7. A non-aqueous electrolyte secondary battery comprising: an electrode group including a positive electrode, a negative electrode, and the separator of claim 1 interposed between the positive electrode and the negative electrode; and a non-aqueous electrolyte.

8. The non-aqueous electrolyte secondary battery in accordance with claim 7 having a capacity density of 44,000 mAh/kg or more.

* * * * *